US008007954B2

(12) United States Patent
Gorte et al.

(10) Patent No.: US 8,007,954 B2
(45) Date of Patent: Aug. 30, 2011

(54) USE OF SULFUR-CONTAINING FUELS FOR DIRECT OXIDATION FUEL CELLS

(75) Inventors: Raymond J. Gorte, Narberth, PA (US); John M. Vohs, Newtown Square, PA (US)

(73) Assignee: The Trustees of The University of Pennsylvania, Philadelphia, PA (US)

( * ) Notice: Subject to any disclaimer, the term of this patent is extended or adjusted under 35 U.S.C. 154(b) by 24 days.

(21) Appl. No.: 10/053,085

(22) Filed: Nov. 9, 2001

(65) Prior Publication Data

US 2003/0035989 A1 Feb. 20, 2003

Related U.S. Application Data

(60) Provisional application No. 60/247,444, filed on Nov. 9, 2000, provisional application No. 60/269,525, filed on Feb. 19, 2001, provisional application No. 60/289,462, filed on May 8, 2001, provisional application No. 60/308,313, filed on Jul. 27, 2001.

(51) Int. Cl.
*H01M 4/48* (2010.01)
*H01M 8/10* (2006.01)
*H01M 8/22* (2006.01)

(52) U.S. Cl. .................... 429/488; 429/502

(58) Field of Classification Search ............. 429/30, 429/40, 45, 488, 502
See application file for complete search history.

(56) References Cited

U.S. PATENT DOCUMENTS

| 4,228,033 A * | 10/1980 | Yamauchi et al. ............ 502/26 |
| 4,661,422 A | 4/1987 | Marianowski et al. |
| 4,791,033 A * | 12/1988 | Patel ............................ 429/19 |
| 4,812,329 A * | 3/1989 | Isenberg ...................... 427/115 |
| 5,021,921 A | 6/1991 | Sano et al. |
| 5,071,718 A | 12/1991 | Marianowski et al. |
| 5,290,323 A | 3/1994 | Okuyama et al. |
| 5,306,411 A | 4/1994 | Mazanec et al. |
| 5,350,641 A * | 9/1994 | Mogensen et al. ............ 429/30 |
| 5,445,903 A * | 8/1995 | Cable et al. .................. 429/33 |
| 5,543,239 A | 8/1996 | Virkar et al. |
| 5,589,285 A * | 12/1996 | Cable et al. .................. 429/13 |
| 5,656,387 A | 8/1997 | Barnett et al. |
| 5,670,270 A | 9/1997 | Wallin |
| 5,676,806 A | 10/1997 | Van Berkel et al. |
| 5,678,647 A | 10/1997 | Wolfe et al. |
| 5,731,097 A | 3/1998 | Miyashita et al. |

(Continued)

FOREIGN PATENT DOCUMENTS

CA 1291788 C 11/1991

(Continued)

OTHER PUBLICATIONS

Park et al., "Direct oxidation of hydrocarbons in a solid-oxide fuel cell" Nature 2000 (pp. 265-267).

(Continued)

*Primary Examiner* — Gregg Cantelmo
*Assistant Examiner* — Eugenia Wang
(74) *Attorney, Agent, or Firm* — Woodcock Washburn, LLP

(57) ABSTRACT

Provided are solid oxide fuel cells that include a solid electrolyte and a porous ceramic anode, the fuel cells being capable of operating on a sulfur-containing hydrocarbon fuel having a sulfur content of from about 1 ppm to about 5000 ppm and an oxygen source. Also provided are processes of producing electrical energy with the disclosed fuel cells.

33 Claims, 15 Drawing Sheets

*We can remake Ni cermets.*

U.S. PATENT DOCUMENTS

| | | | |
|---|---|---|---|
| 5,747,185 A | | 5/1998 | Hsu |
| 6,017,647 A | * | 1/2000 | Wallin ............................ 429/33 |
| 6,051,330 A | * | 4/2000 | Fasano et al. .................... 429/30 |
| 6,089,201 A | | 7/2000 | Hubbard |
| 6,123,913 A | | 9/2000 | Clawson et al. |
| 6,139,666 A | | 10/2000 | Fasano et al. |
| 6,156,084 A | | 12/2000 | Bonville, Jr. et al. |
| 6,156,290 A | | 12/2000 | Lee et al. |
| 6,159,256 A | | 12/2000 | Bonville, Jr. et al. |
| 6,166,258 A | | 12/2000 | Corbin et al. |
| 6,183,896 B1 | | 2/2001 | Horita et al. |
| 6,209,494 B1 | | 4/2001 | Manikowski, Jr. et al. |
| 6,209,508 B1 | | 4/2001 | Tinney |
| 6,214,485 B1 | | 4/2001 | Barnett et al. |
| 6,218,591 B1 | | 4/2001 | Lee et al. |
| 6,221,280 B1 | * | 4/2001 | Anumakonda et al. ....... 252/372 |
| 6,248,468 B1 | | 6/2001 | Ruka et al. |
| 6,251,533 B1 | | 6/2001 | Christiansen |
| 6,303,098 B1 | | 10/2001 | Kramarz et al. |
| 6,423,896 B1 | * | 7/2002 | Keegan .......................... 136/253 |
| 6,468,941 B1 | * | 10/2002 | Bortun et al. ................. 502/300 |
| 6,558,831 B1 | | 5/2003 | Doshi et al. |
| 6,589,680 B1 | * | 7/2003 | Gorte et al. ..................... 429/33 |
| 6,677,070 B2 | | 1/2004 | Kearl |

FOREIGN PATENT DOCUMENTS

| | | |
|---|---|---|
| CA | 2334884 A1 | 12/1999 |
| CA | 2342154 A1 | 12/1999 |
| EP | 338823 | 10/1989 |
| EP | 0996184 A2 | 4/2000 |
| JP | 01007475 | 1/1989 |
| JP | 4-206362 | 7/1992 |
| JP | 4-322061 A | 11/1992 |
| JP | 10-505738 A | 6/1998 |
| JP | 11-297344 A | 10/1999 |
| JP | 2000-133280 | 5/2000 |
| WO | WO 96/07560 A1 | 3/1996 |
| WO | WO 99/67018 A1 | 12/1999 |
| WO | 0013791 | 3/2000 |
| WO | WO 00/52780 A1 | 9/2000 |

OTHER PUBLICATIONS

R.J. Gorte, et al. "Anodes for Direct Oxidation of Dry Hydrocarbons in a Solid-Oxide Fuel Cell," *Advanced Materials*, 12, 19 (Oct. 2, 2000) 1465-1469.

K. Eguchi, et al., Electrical properties of ceria-based oxides and their application to solid oxide fuel cells, *Solid State Ionics*, 52 (1992) 165-172.

Mogens Mogensen, Thomas Lindegaard , Uffe Rud Hansen and Gurli Mogensen, Physical Properties of Mixed Conductor Solid Oxide Fuel Cell Anodes of Doped $CeO_2$, *J. Electrochem. Soc.*, vol. 141, No. 8, Aug. 1994, pp. 2122-2128.

E.S. Putna, J. Stubenrauch, J.M. Vohs, and R. J. Gorte, Langmuir, Ceria-Based Anodes for the Direct Oxidation of Methane in Solid Oxide Fuel Cells, *J. Electrochem. Soc.* vol. 11, No. 12, 1995, pp. 4832-4837.

R.T. Baker, I.S. Metcalfe, P.H. Middleton and B.C.H. Steele, Evaluation of perovskite anodes for the complete oxidation of dry methane in solid oxide fuel cells, *Solid State Ionics* 72, (1994) pp. 328-333.

K. Asano, T. Hibino and H. Iwahara,.A Novel Solid Oxide Fuel Cell System Using the Partial Oxidation of Methane, *J. Electrochem Soc.*, vol. 142, No. 10, Oct. 1995, pp. 3241-3245.

Yoshiko Hiei, Tatsumi Ishihara, Yusaku Takita, Partial Oxidation of methane for internally reformed solid oxide fuel cell, *Solid State Ionics*, 86-88 (1996), pp. 1267-1272.

Calvin H. Bartholomew, Carbon Deposition in Steam Reforming and Methanation, Catalysis Reviews-Sci. Eng., 24(1), 67 (1982).

T. Kawada, N. Sakai, H. Yokokawa and M. Dokiya Electrical properties of transition-metal doped YSZ, , *Solid State Ionics*, 53-56 (1992) 418-425, North Holland.

Tsepin Tsai and Scott A. Barnett, Effect of Mixed-Conducting Interfacial Layers on Solid Oxide Fuel Cell Anode Performance, *J. Electrochem. Soc.*, vol. 145, No. 5, May 1998.

Hibiki Itoh, Tohru Yamamoto, Masashi Mori, Teruhisa Horita, Natsuko Sakai, Harumi Yokawa and Masayuki Dokiya, Configurational and Electrical Behavior of Ni-YSZ Cermet with Novel Microstructure for Solid Oxide Fuel Cell Anodes, *J. Electrochem. Soc.*, vol. 144, No. 2, Feb. 1997.

Hibiki Itoh, Tohru Yamamoto, Masashi Mori, Takao Watanabe, and Toshio, Abe Improved Microstructure of Ni-YSZ Cermet Anode for SOFC with a Long Term Stability, , *Electrochemical Soc.* Japan, 64, No. 6, (1996), pp. 549-554.

Mogens Mogensen, Steen Skaarup, Kinetic and geometric aspects of solid oxide fuel cell electrodes, *Solid State Ionics*, 86-88 (1996) pp. 1151-1160.

Watanabe, H. Uchida, M. Shibata, N. Mochizuki, and K. Amikura, High Performance Catalyzed-Reaction Layer for Medium Temperature Operating Solid Oxide Fuel Cells, *J. Electrochem. Soc.*. vol. 141, No. 2, Feb. 1993, pp. 342-346.

R. T. K. Baker, Catalytic Growth of Carbon Filaments, *Carbon*, vol. 27, No. 3, pp. 315-323, 1989.

Haytham Alqahtany, Douglas Eng., and Michael Stoukides, Methane Steam Reforming Over Fe Electrodes in a Solid Electrolyte Cell, *Energy & Fuels*, 1993, 7, 495-504.

N.M. Sammes, M. Brown, I. W.M. Brown, Synthesis and properties of dense nickel and cobalt zirconia cermet anodes for solid oxide fuel cells, *Journal of Materials Science* (UK), vol. 31, No. 22, pp. 6069-6072, Nov. 15, 1996.

* cited by examiner

Can we make cells that are stronger?

Cell made from 40%Ni/YSZ cermet, after removal of Ni and addition of ceria & Cu.

USE OF SULFUR-CONTAINING FUELS FOR DIRECT OXIDATION FUEL CELLS

CROSS-REFERENCE TO RELATED APPLICATIONS

This patent application claims the benefit of U.S. Provisional Patent Application No. 60/247,444 filed Nov. 9, 2000, U.S. Provisional Patent Application No. 60/269,525 filed Feb. 19, 2001, U.S. Provisional Patent Application No. 60/289,462 filed May 8, 2001, and U.S. Provisional Patent Application No. 60/308,313 filed Jul. 27, 2001, the entire disclosures of which are incorporated by reference herein.

BACKGROUND OF THE INVENTION

1. Field of the Invention

This invention relates to fuel cell technology and more particularly to a solid oxide fuel cell capable of being operated with a sulfur-containing hydrocarbon fuel, as well as methods of fabrication of such fuel cells and their use for producing electric energy.

2. Description of Prior Art

Solid-oxide fuel cells (SOFCs) have grown in recognition as a viable, high temperature source of electric energy. As the operating temperatures of these fuel cells typically exceed 600° C. and may be as high as 1,000° C., the materials used for the cell components are limited to those that are stable at such temperatures. The electrolyte of the cells is made primarily from dense ceramic materials. The electrolyte conducts oxygen anions ($O^{2-}$) but is an electronic insulator.

It is known to prepare anode materials for solid-oxide fuel cells using nickel (Ni) cermets prepared from NiO and yttria-stabilized zirconia (YSZ) powders. N. Q. Minh, *Journal of the American Ceramic Society*, 76: 563 (1993), the entire disclosure of which is incorporated by reference herein. High-temperature calcination at greater than 1200° C. is essential in order to obtain the necessary ionic conductivity in the YSZ portion of the anode.

In most conventional fuel cells, hydrogen gas is either fed directly to the anode or produced by steam reforming of hydrocarbons, such as methane. Steam reforming is costly and adds significant complexity to the system. It has been proposed to use dry methane; however, Ni catalyzes the formation of carbon fibers in dry methane, resulting in carbon formation on the anode. Ni-containing anodes can be used only if the fuel cells incorporating them are operated at steam/methane ratios greater than 1.7. However, there are significant advantages to be gained by operating under dry conditions. These include easier management of heat, no requirement of adding steam, and the possibility of lower operating temperatures due to the fact that equilibrium for direct oxidation is always favorable.

Some of the shortcomings of nickel-based anode materials in SOFCs have been overcome by the use of copper-containing anodes. See, for example, R. Gorte et al., *Advanced Materials*, 12: 1465-69 (2000), the entire disclosure of which is incorporated by reference herein. It has been shown that replacement of nickel with copper in the anode material avoids the problem of carbon formation, when using dry hydrocarbon fuels. See S. Park, et al., *Nature*, 404: 265-57 (2000), the entire disclosure of which is incorporated by reference herein.

Fuel cells are normally operated with hydrogen as the fuel. It has been proposed to replace hydrogen with commercially available and more economical hydrocarbon fuels such as natural gas, gasoline, diesel fuel, naphtha, fuel oil and the like. Such raw fuels are not currently in use as a fuel source suitable for a fuel cell because these fuels contain relatively high levels of sulfur, often as naturally-occurring complex organic sulfur compounds. For example, gasoline sold in the United States has an average sulfur level of 300 ppm. Also, sulfur compounds such as mercaptans and thiols are added as odorants to natural gas at levels between 10 and 20 ppm so that leaks may be detected.

Most conventional fuel cells are operated on hydrogen gas. Oxidation in the presence of sulfur results in a poisoning effect on catalysts used in the hydrogen generation system, often including the fuel cell anode catalyst. Accordingly, the hydrocarbon fuels currently in use in fuel cells are routinely desulfurized and then reformed to hydrogen gas.

In one such operation, conventional fuel-processing systems used with stationary fuel cell power plants include a thermal steam reformer, such as that described in U.S. Pat. No. 5,516,344. In such a fuel-processing system, sulfur is removed by conventional hydrodesulfurization techniques, which typically rely on a certain level of recycle as a source of hydrogen for the process. The recycle hydrogen combines with the organic sulfur compounds to form hydrogen sulfide within a catalytic bed. The hydrogen sulfide is then removed, using a zinc oxide bed to form zinc sulfide. The general hydrodesulfurization process is disclosed in detail in U.S. Pat. No. 5,292,428. While this system can be used in large stationary applications, it adds significant complexity to the systems.

Other fuel-processing systems, such as conventional autothermal reformers, which have a higher operating temperature than conventional thermal steam reformers, can produce hydrogen-rich gas in the presence of the aforesaid complex organic sulfur compounds without prior desulfurization. According to U.S. Pat. No. 6,159,256, when using an autothermal reformer to process raw fuels containing complex organic sulfur compounds, the result is a loss of autothermal reformer catalyst effectiveness and useful catalyst life of the remainder of the fuel-processing system. Before feeding the reformate to the fuel cell, it has been reported that the $H_2S$ concentration must be decreased to 0.05 ppm. Y. Matsuzaki and I. Yasuda, "SOFC VII, Proceeding of the $7^{th}$ Intern. Symp.," Electrochemical Society, Pennington, N.J., 2001:16 (2001), p. 769.

Alternatively, sulfur, in the form of hydrogen sulfide, can be removed from the gas stream by passing the gas stream through a liquid scrubber, such as sodium hydroxide, potassium hydroxide or amines. Liquid scrubbers are large and heavy and are, therefore, useful principally only in stationary fuel cell power systems.

SUMMARY OF THE INVENTION

It is an objective of this invention to overcome the problems associated with the presence of complex organic sulfur compounds in a hydrocarbon fuel stream for use in a fuel cell, without increasing fuel-processing complexity.

It is a further objective of this invention to provide a fuel cell that can operate with a sulfur-containing hydrocarbon fuel.

It is another objective of this invention to provide a fuel cell that can operate with fuel that does not have to undergo prior treatment to remove complex organic sulfur compounds.

It is yet a further objective of this invention to provide a process by which a fuel cell that is contaminated by sulfur can be restored to full performance after being deactivated by sulfur poisoning.

It is another objective of this invention to provide a method of fabricating a porous, direct-oxidation anode for a solid-oxide fuel cell starting from a nickel cermet.

It is another objective of this invention to provide a method for preparing a layered ceramic structure comprising a direct oxidation anode with a supported electrolyte, which may incorporate an additional layer to impart greater strength to the structure.

It is a further objective of this invention to provide a method for preparation of a porous copper or Ni—Cu alloy cermet for use as a porous direct-oxidation anode for a solid-oxide fuel cell.

It is yet another objective of this invention to provide a solid-oxide fuel cell, having a ceramic-metal alloy composite anode, which operates efficiently using a dry hydrocarbon fuel containing sulfur.

It is still another objective of the present invention to provide a process of producing electrical energy by means of the above-described SOFC.

These and other objectives are achieved according to the present invention, which is embodied in a solid oxide fuel cell comprising a solid electrolyte that is an electronic insulator which allows transfer of anions, a ceramic-metal composite anode and a cathode, and which operates using a fuel comprising a sulfur-containing hydrocarbon and having a sulfur content of from about 1 ppm to about 5000 ppm and an oxygen source.

The hydrocarbon may be a petroleum distillate selected from the group consisting of gasoline, diesel oil, naphtha, JP-4, JP-5, JP-8, kerosene, motor oil, natural gas, and fuel oil. Other preferred hydrocarbons and their derivatives are alcohols including ethanol and methanol and dry methane, butane, toluene and decane. Mixtures of hydrocarbons can also be used. The sulfur-containing fuels preferably have a sulfur concentration of from about 1 ppm to about 1000 ppm and more preferably a sulfur concentration of from about 1 ppm to about 500 ppm.

The invention also provides a process of producing electrical energy. The process of the invention comprises providing a solid oxide fuel cell comprising a solid electrolyte that is an electronic insulator which allows transfer of anions, a ceramic-metal composite anode and a cathode, and the further steps of contacting the fuel cell cathode with an oxygen source and contacting the anode with a fuel comprising a sulfur-containing hydrocarbon having a sulfur content of about 1 ppm to about 5000 ppm.

The invention additionally provides a process for restoring the performance of a fuel cell deactivated by sulfur poisoning, by heating the anode in steam for a period of time sufficient to effect removal of the sulfur.

The present invention further provides a method of fabricating a porous copper cermet or copper-nickel alloy cermet from a sintered nickel cermet with nickel content between about 10% and about 60% for use as a direct-oxidation anode. The method comprises leaching at least a part of the nickel from the cermet, thereby increasing the cermet's porosity. Cu is then added back into the pore structure to obtain a Cu cermet. In one embodiment, the porous structure is impregnated with a soluble, copper-containing impregnant, preferably a copper salt. The impregnated cermet is subjected to a temperature sufficient to convert the copper-containing impregnant to copper oxide which, in turn is reduced to elemental copper, resulting in the formation of a copper cermet or copper-nickel alloy cermet, depending on the amount of nickel removed during the leaching step.

In a preferred embodiment, a multi-layer ceramic piece is fabricated with one layer containing NiO and YSZ and the other YSZ only. These layers can each be formed by conventional tape casting methodology. In carrying out this embodiment of the invention, a slurry of the first tape casting formulation, comprising a binder, a carrier medium and a ceramic powder comprising nickel oxide and yttrium-stabilized zirconia (YSZ), and optimally, an organic pore forming agent, is applied to a supporting substrate (such as Mylar® film) and formed into a first tape. A second tape casting formulation is prepared in the form of a slurry comprising a binder, a carrier medium and a ceramic powder, at least a portion of which is YSZ. The slurry of the second tape casting formulation is applied to a supporting substrate, which may be the first tape, and formed into a second tape. This second tape, after sintering, forms a dense YSZ which serves as the electrolyte.

The first tape and the second tape are superposed one on the other to provide a laminate preform. The laminate preform is heated to a temperature sufficient to sinter the ceramic powder, after which the nickel oxide is reduced to elemental nickel. The resulting laminate is thereafter processed in the manner described above for converting a nickel cermet to a direct-oxidation anode material.

The present invention also provides a method of strengthening the above-described direct-oxidation anode with (or without) the supported electrolyte. The method involves forming another tape casting formulation which is used to provide a reinforcing layer on the aforementioned laminate preform. The formulation is in the form of a slurry comprising a binder, a carrier and a ceramic powder comprising YSZ, or another compound, whose coefficient of thermal expansion, when sintered, is compatible with that of sintered YSZ. A slurry of this third tape casting formulation is applied to a supporting substrate and formed into a third tape. The thickness of the third tape is relatively thicker than the thickness of the second tape. The third tape is perforated to form at least one aperture, and preferably several apertures, through the thickness of the tape. The perforated third tape is superimposed upon the porous first tape. The three-layer preform is then sintered and further processed to remove Ni in the manner described above to produce a reinforced direct-oxidation anode with supported electrolyte structure. The resulting three-layer structure has greater mechanical strength than the two-layer laminate.

The present invention also provides a solid-oxide fuel cell comprising a solid electrolyte comprised of an electrical insulator which allows transfer of anions, an anode and a cathode. The anode material, with or without supported electrolyte, is prepared using the methods described above.

The present invention additionally provides a process of producing electrical energy. This process comprises the steps of providing the solid-oxide fuel cell described immediately above, contacting the cathode of that fuel cell with an oxygen source and contacting the anode of that fuel cell with a fuel.

DESCRIPTION OF PREFERRED EMBODIMENTS

Figure 1A:
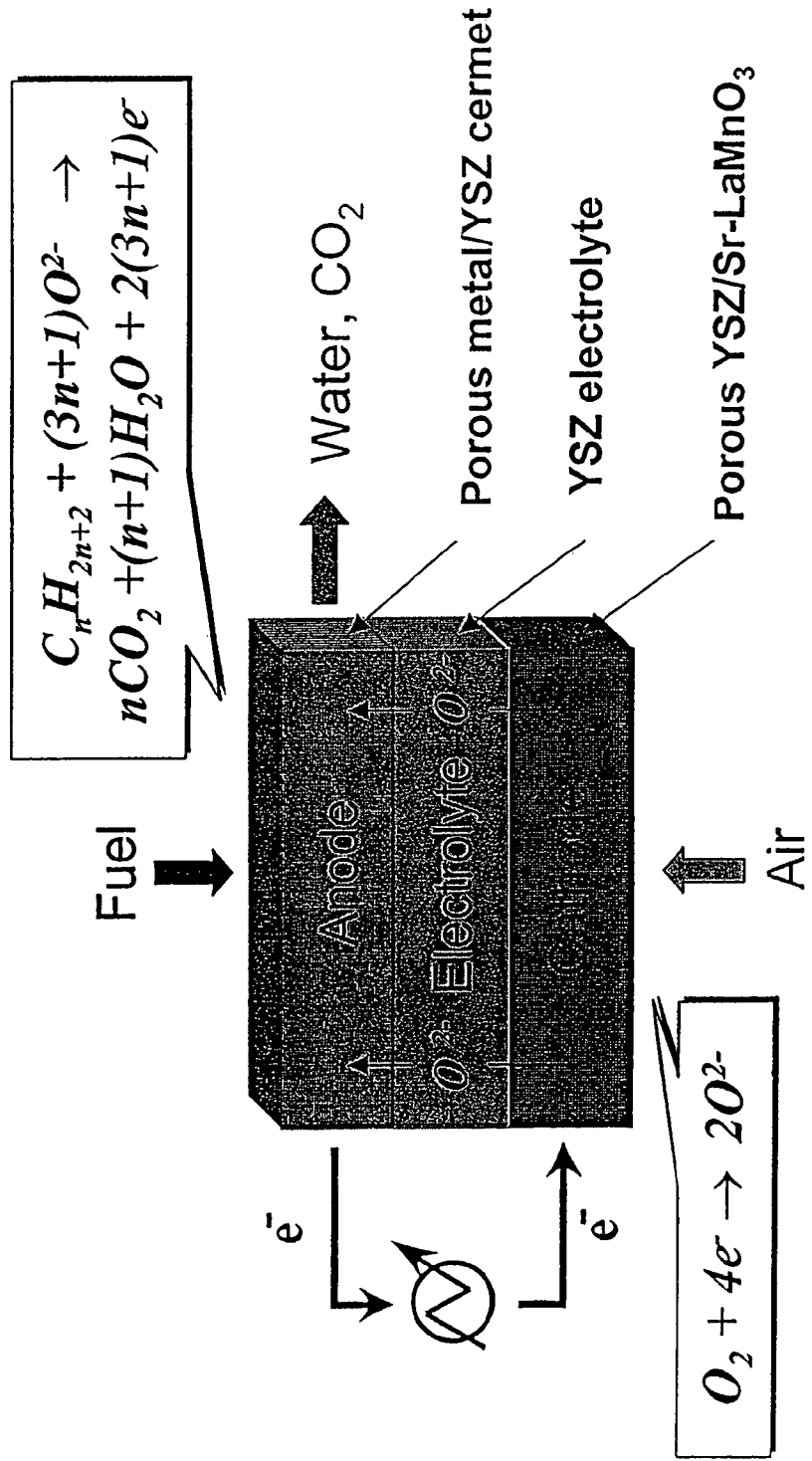
FIG. 1A is a diagrammatic illustration of the operation of a solid-oxide fuel cell of the invention.
Figure 1B:
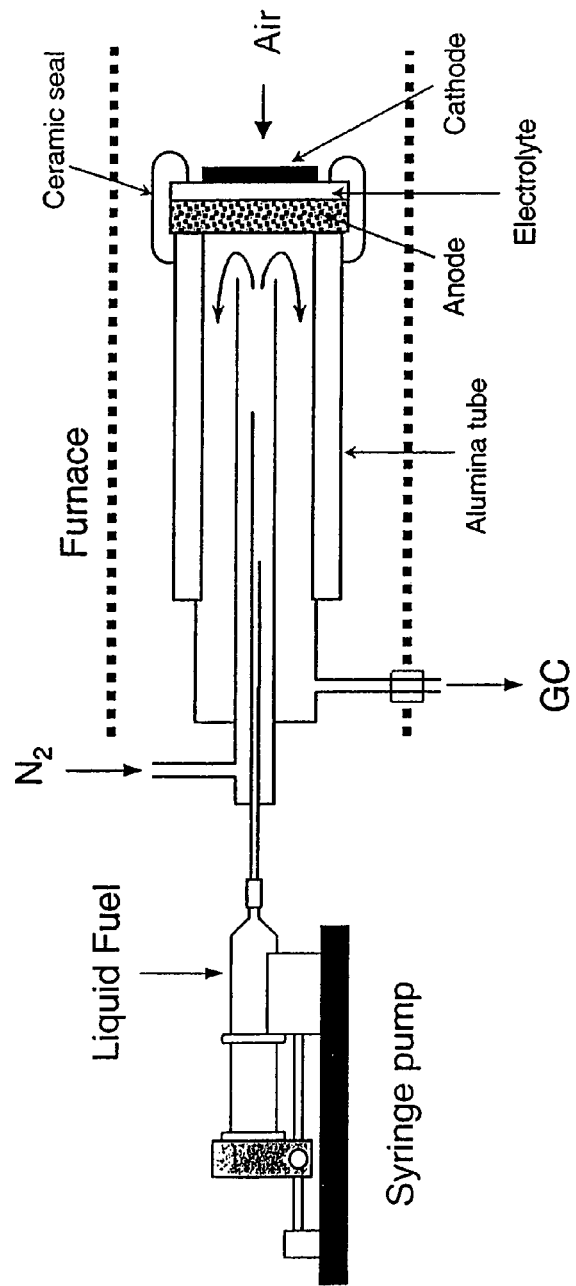
FIG. 1B is a diagrammatic illustration of a fuel cell which is suitable for use in practicing the present invention.
Figures 2A, 2B, 2C, 2D, 2E:
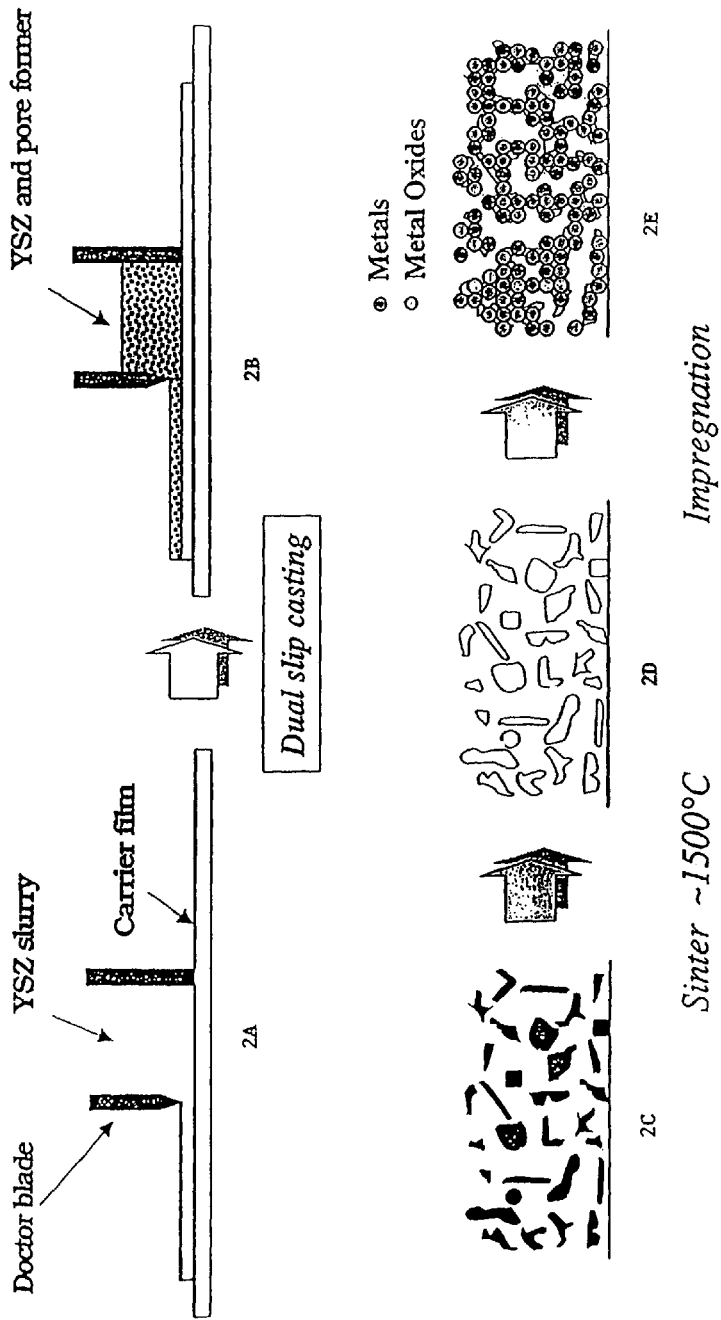
FIGS. 2A, 2B, 2C, 2D AND 2E provide a diagrammatic illustration of the preferred method of fabricating an anode of the invention.

FIGS. 1A and 1B are, respectively, diagrammatic representations of the operation of a solid oxide fuel cell and the operation of a fuel cell of the invention. According to FIGS. 1A and 1B, molecular $O_2$ from an oxygen source is reduced to $O^{2-}$ anions at the cathode, after which the $O^{2-}$ diffuses through the electrolyte to the anode, where it oxidizes the fuel, in this case, a hydrocarbon fuel. The external current is produced by the flow of electrons from the anode through an external circuit to the cathode. Water and carbon dioxide are also produced by the oxidation reaction at the anode, and are removed from the fuel cell.

The electrolyte is an electronic insulator which allows transfer of ions. The electrolyte is preferably an oxide ion conducting material. Suitable oxide ion conducting materials include doped ceria such as gadolinium-doped ceria, samarium-doped ceria, doped zirconia such as scandium-doped zirconia, yttria-doped zirconia and calcium-doped zirconia and doped lanthanum gallate such as strontium-doped lanthanum gallinum oxide. Other suitable oxide ion conducting materials are bismuth oxides or vanadates, perovskites containing maganese, cobalt, iron, nickel, vanadium, chromium or other metals. Preferably the electronic insulator is a doped ceria or doped zirconia and is most preferably yttrium-stabilized zirconia. See, for example, U.S. Pat. Nos. 6,214,485 to Barnett et al., and 6,303,098 to Kramarz et al., which patents are incorporated herein by reference, and U.S. Pat. No. 5,670,270 to Wallin.

The anode/electrolyte structure of the fuel cell of the invention may be prepared by any suitable method, some of which are exemplified directly below. For example, the unsintered mixture of electronically-conductive and ionically-conductive materials may be deposited on a layer comprising a sintered or unsintered ionically-conductive electrolyte material prior to being sintered, to ensure sufficient contact between the layers, as illustrated in the process of the second aspect of the invention. In one embodiment of such a process, the mixture of ionically-conductive and electronically-conductive materials is deposited on an unsintered layer of electrolyte material and the mixture and electrolyte layer are sintered simultaneously. In another embodiment, the mixture is deposited on a previously sintered layer of electrolyte, and then sintered.

The mixture of ionically-conductive and electronically-conductive particles may be applied to the layer comprising particles of an electrolyte material (hereafter "electrolyte layer"), by any suitable means such as, for example, tape casting methods, screen-printing or silk-screening a slurry of the material(s) onto the electrolyte structure.

Other means of forming the electrode/electrolyte structure are tape calendering and slip casting. Tape calendering generally includes the steps of forming an electronically conductive tape from an electronically conductive component as well as forming an electrolyte tape from an electrolyte component. The tapes are then rolled together to form a multilayer composite tape. In slip casting, a slurry of a conductive ceramic material and a liquid vehicle such as water, optionally with an organic binder and surfactants is cast into a mold to provide the desired shaped article. The specific amounts of ceramic material, organic binder and liquid vehicle can be varied depending on the density desired in the cast product. The resulting cast product is dried and fired by conventional means to produce the desired electrode. See also, for example, U.S. Pat. Nos. 6,270,536 to Minh, and 5,670,270 to Wallin, the entire disclosures of which patents are incorporated herein by reference.

In a preferred embodiment of this invention, the ceramic-metal composite anode of the fuel cell is preferably prepared as illustrated in FIGS. 2A, 2B, 2C, 2D and 2E. In this method, yttria-stabilized zirconium (YSZ) powder is mixed with a polymer and spread onto a suitable film material, e.g., Mylar®, to form a green tape. Next, a similar polymer-YSZ slurry is mixed with a pore former and applied to the exposed surface of the first tape, which contains no pore former. The cast tapes are then co-sintered to form a porous layer consisting essentially of porous YSZ on a generally planar sheet of relatively dense YSZ. The pore former, e.g., carbon particles, is consumed during the sintering step and substantially none remains in the resulting porous YSZ layer.

Thereafter, copper is incorporated into the anode material by aqueous impregnation using a concentrated salt solution, e.g., $Cu(NO_3)_2$, followed by calcination to a temperature on the order of 600° C. for a period of about two hours, which decomposes the nitrates and forms oxides. Reduction of the copper oxide yields the elemental form of copper. The resulting material has sufficient mechanical strength for anode-supported electrolytes.

The metal content of the anode material is at least 10%, preferably 25%, and more preferably at least 35% by weight.

Copper is the preferred metal for use in the anode, but the metal may be an alloy such as copper with a second conductive metal. The alloy contains between about 5% and about 95% by weight copper and about 5% to about 95% by weight of the second metal, and more preferably between about 50% and about 90% by weight copper and about 10% to about 50% by weight of the second metal. One hundred percent (100%) Cu is preferred.

Other components including ceria oxide ($CeO_2$), are preferably added using the same impregnation methods. $CeO_2$ plays a dual role in the anode. First, it provides ionic and electronic conductivity, thereby increasing the reaction zone created where the gas phase, the ionic conductor and the electronic conductor come together, which is commonly referred to as the three-phase boundary or TPB. Secondly, $CeO_2$ provides catalytic activity for the oxidation of hydrocarbons.

The term "consisting essentially of yttria-stabilized zirconia," as used herein in reference to the porous layer of the ceramic-metal composite anode, is intended to signify the substantial absence from such layer of any fibrous component whose function is to impart porosity to the layer by becoming a component of the finished anode material (in contrast to pore formers that are consumed during sintering), and, in particular, to the absence of zircon fibers and the like which, due to siliceous surface coating, have a detrimental effect on SOFC performance.

The term "oxygen source," as used herein, refers to air and oxygen in more purified form than present in air.

The term "fuel," as used herein, refers to hydrogen and any hydrocarbon fuel, wherein hydrocarbon is defined as any flammable compound that consists of, or includes as primary elements, hydrogen, carbon and oxygen.

As noted above, conventional fuel cells have used hydrogen as fuel. The solid oxide fuel cells of the invention are intended to be operated with a wide variety of hydrocarbon fuels, including mixtures of these fuels. Sulfur-containing hydrocarbons can also be used. These include, without limitation, petroleum distillates such as gasoline, diesel oil, naphtha, JP-4, JP-5, JP-8, kerosene, motor oil, natural gas and fuel oil. Other preferred hydrocarbons and derivatives are alcohols, including ethanol and methanol, and dry methane, butane, toluene and decane. The fuel cell of the invention is normally operated at about 650-900° C.

The fuel cell of the invention can operate successfully with hydrocarbons containing between 1 ppm and 5000 ppm sulfur. As demonstrated herebelow, the fuel cell of the invention is operated successfully with hydrocarbons containing between 250 ppm and 5000 ppm sulfur including 500 ppm and 1000 ppm sulfur. It is preferred to use as fuel hydrocarbons containing from 1 ppm to 1000 ppm sulfur and more preferably from 1 ppm to 500 ppm sulfur. Commercial gasoline is a suitable fuel. Depending upon state regulations and other requirements, commercial gasoline typically has about 300 ppm sulfur but may have, for example, sulfur concentrations of less than about 10 ppm, about 10 ppm, about 20 ppm, or about 100 ppm.

As noted above, the efficiency of the fuel cell does not appear to be noticeably affected by the use of hydrocarbons with sulfur concentrations below 1000 ppm for a process such as a cyclic process, in which the fuel cell is operated for ten (10) hours or less. For a process involving continuous use of the fuel cell for one hundred (100) hours or more, the efficiency of the fuel cell does not appear to be noticeably affected by the use of hydrocarbons with sulfur concentrations below 100 ppm. In the event that the fuel cell becomes deactivated by sulfur poisoning, the performance of the cell can be restored by heating the anode in steam. In a preferred embodiment, this heating process is carried out in a mixture of steam and a dilutant, preferably $N_2$ or $CO_2$. Preferred ratios of steam to $CO_2$ are between 100:0 and 5:95. The anode is preferably heated for reactivation at a temperature of between about 600° C. and about 800° C., and preferably at about 700° C. for a period of one (1) to five (5) hours, and most preferably, for about one (1) hour to about three (3) hours.

Figure 3:
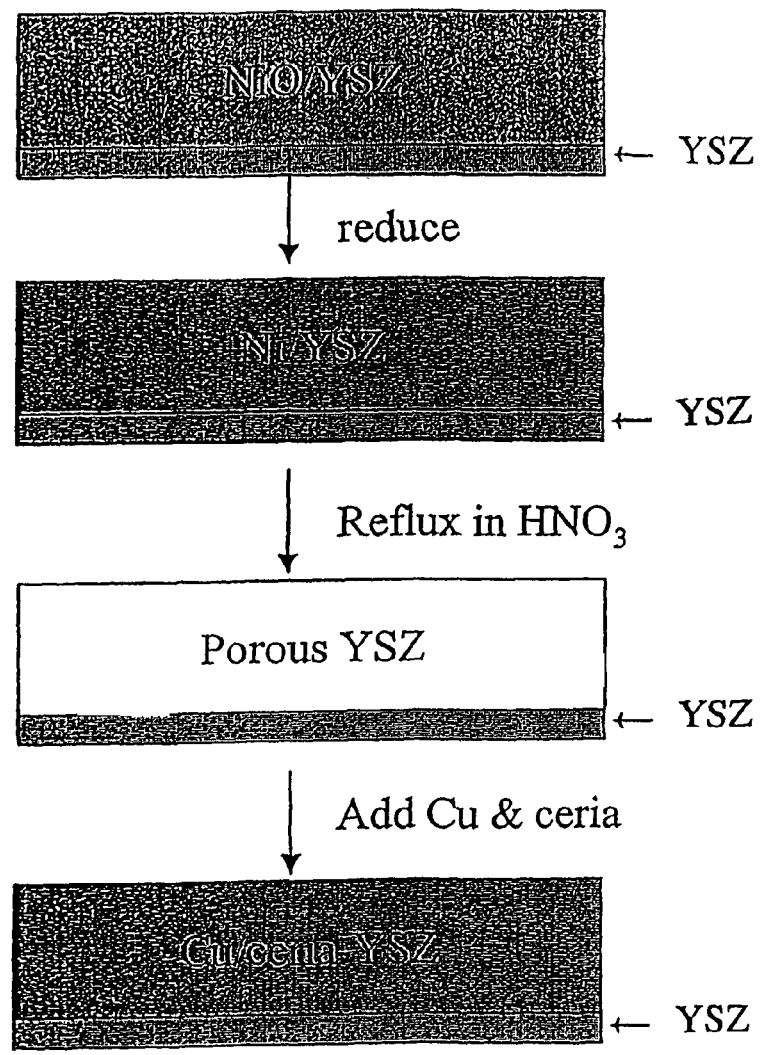
FIG. 3 is a diagrammatic illustration of the process for fabricating in accordance with this invention.

In accordance with a preferred feature of the invention shown diagrammatically in FIG. 3, the starting material is a nickel cermet (Ni and YSZ composite, containing at least 10% Ni so as to provide electronic conductivity) prepared by any known technique. See, for example, N. Q. Minh, *Journal of the American Ceramic Society.* 76: 563 (1993). The reduction of NiO to elemental nickel imparts a porous character to the cermet. The cermet is contacted with a leaching agent to remove at least a portion of the nickel, thereby increasing the porosity of the cermet. The porous cermet is next contacted with a copper-containing impregnant. The porous copper-containing cermet is then further treated to form a porous copper cermet or copper-nickel alloy cermet (depending on the amount of nickel removed during leaching), which is used as the direct-oxidation anode material for a solid-oxide fuel cell.

In the preferred embodiment referenced above, the ceramic powder of the first tape casting formulation comprises a ceramic powder containing NiO and YSZ, a binder and water as the carrier, so as to form a slurry. The backing sheet is preferably a Mylar® cellulose acetate film. The first tape casting formulation also preferably includes glycerol as a plasticizer and a pore former. The slurry of the first tape casting formulation is applied to a supporting substrate and formed into a first tape.

Then a second tape casting formulation is prepared in the form of a slurry comprising a binder, a carrier medium and a YSZ powder. The second tape casting formulation does not contain any ingredient functioning as a pore former. The slurry of the second tape casting formulation is applied to a supporting substrate and formed into a second tape. The first tape may conveniently serve as the supporting substrate for the second tape, or a separate backing material can be used, if desired. In either case, the tapes are superposed one on the other to form an assemblage, and after sintering, the first tape is converted to the direct-oxidation anode, whereas the second tape becomes the supported electrolyte.

The amount of water used in the tape casting slurry is preferably about 20-40 wt. % based on the total weight of the composition. The formulations may additionally contain minor amounts of known processing expedients such as dispersants and defoaming agents. The amount of dispersant and defoaming agent may comprise about 1-5 wt. % and 0.05-0.5 wt. %, respectively, based upon the weight of the ceramic powder.

In a preferred embodiment, the first tape casting formulation also contains in addition to NiO another pore-forming agent. It is preferred that the other pore-forming agent is an organic material. A particularly preferred pore-forming agent is powdered graphite.

The multi-layer tape is typically removed from the backing sheet to allow the tape to be sintered to form a ceramic article. Removal of the backing sheet may be optional if the sheet is readily decomposed during sintering.

The casting may be performed by any known tape-casting technique. The preferred method of casting is a conventional doctor blade tape casting, comprising the following steps. First, the slurry is poured onto a backing sheet which is typically supported by a flat plate. The backing sheet and slurry are then passed under a doctor blade set at a height above the sheet corresponding to the desired tape thickness. The resulting tape is then dried to increase its strength and decrease tackiness. The binder sets during casting and drying as it cools to room temperature. The dried tape preferably has a thickness of about 25-2,500 μm.

In this preferred embodiment, the time and temperature of sintering of the multi-layer assemblage, or laminate preform, may vary, but it is preferably carried out at 1,500° C. for two hours. The sintering step will consume all or part of any organic pore-forming agent, resulting in the first tape being porous.

After completion of the sintering step, the NiO will be reduced to elemental nickel as shown in FIG. 3. Typically, this step is effected by reduction in hydrogen gas at a temperature above 500° C. Then at least part of the elemental nickel is leached from the assemblage. The preferred method of carrying out this step is contacting the assemblage with hot nitric acid, which selectively dissolves nickel with no appreciable dissolution of YSZ. The nitric acid can be replaced, if desired, by another leaching agent that selectively dissolves nickel. Preferably, all of the nickel is leached. In another preferred embodiment, about 50% to 99% of the nickel is leached. The removal of the nickel results in an increase in the porosity of the first tape.

After completion of the leaching step, the assemblage is impregnated with a copper-containing impregnant, preferably $Cu(NO_3)_2$. The amount of this material is preferably selected so as to yield an amount of elemental copper that is approximately equivalent to the weight of elemental nickel leached in the leaching step. The material is converted to copper oxide by calcination at a temperature of at least 600° C. The copper oxide is then reduced to elemental copper, generally by reduction in hydrogen gas at a temperature about 500° C., thereby producing the direct-oxidation anode.

The copper content of the anode material is at least 15%, preferably 25%, and more preferably at least 35% by weight. In the embodiment of the invention in which the metal is copper-nickel alloy, the alloy preferably contains between about 5% and about 95% by weight copper and about 5% to about 95% by weight nickel.

Other components, including $CeO_2$, can be added to the anode portion of the assemblage using the same impregnation method described above. $CeO_2$ plays a dual role in the anode. First, it provides ionic and electronic conductivity, thereby increasing the reaction zone created where the gas phase, the ionic conductor and the electronic conductor come together, which is commonly referred to as the three-phase boundary, or TPB. Secondly, $CeO_2$ provides catalytic activity for the oxidation of hydrocarbons.

Figure 4B:
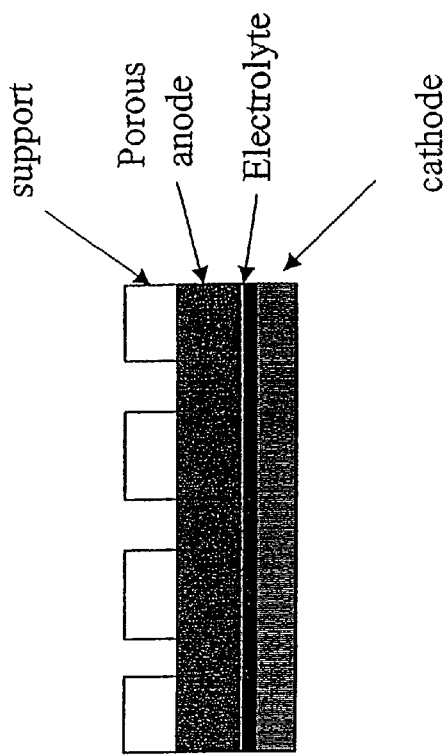
FIG. 4B is a diagrammatic side view illustration of components of a solid-oxide fuel cell.
Figure 4A:
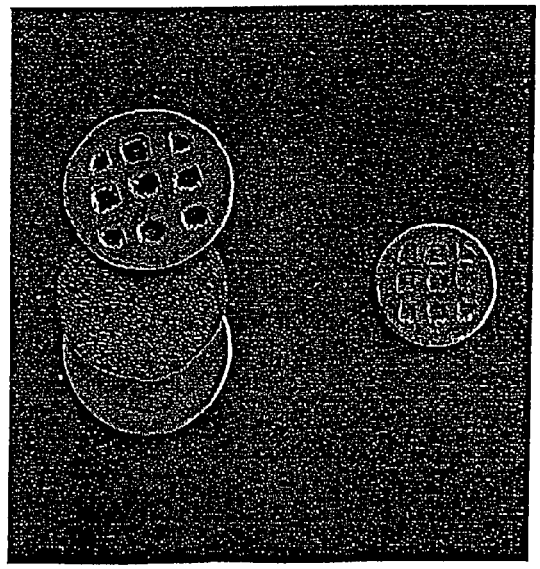
FIG. 4A is a photograph of the three green tapes used to make the reinforced, direct-oxidation anode with supported electrolyte, along with the post-fired structure.

The method of preparing a two-layer laminate preform can be modified by incorporating a third tape in the assemblage to serve as a reinforcing layer in the finished structure, as shown in FIGS. 4A and 4B. According to this method, the third tape casting formulation is prepared in the form of a slurry comprising a binder, a carrier and a ceramic powder, but no pore former. The ceramic powder may comprise YSZ as before or another material such as $MgAlO_2$, which has a coefficient of thermal expansion that is compatible with that of sintered YSZ. The thickness of the third tape is made relatively greater than the thickness of the second tape. The third tape is perforated to form at least one aperture through the thickness of the tape to allow passage of gas and liquid (e.g., copper salt solution) through the tape. The perforation preferably has a periphery with a continuously curved outline, i.e., no sharp angles that would promote cracking or fracturing of the material. The perforated third tape is superimposed on the laminated preform in contact with the porous, first tape.

The resulting cell is then heated to sinter the ceramic powder at 1,500° C. for several hours. Any NiO in the middle layer is then removed by reducing it to Ni and removing it by leaching. Compared with the porous direct-oxidation anode in the two-layer assemblage referenced above, with the addition of this reinforcing layer the three-layer assemblage has greater mechanical integrity.

After the three-layer assemblage is sintered, the cell can undergo the further steps described above in connection with the two-layer assemblage to incorporate therein as a metal conductor, a copper or copper-nickel alloy, as well as $CeO_2$. The layers of this assemblage are shown as FIG. 4A along with the post-fired laminate structure. A finished fuel cell (prior to addition of Cu) embodying this aspect of the present invention is shown in FIG. 4B. In the preferred embodiment, the electrolyte layer is <100 μm thick, the porous layer is between about 100 μm and about 1000 μm, and the support is between about 300 μm and about 5,000 μm.

In a solid-oxide fuel cell, the anode must catalyze the reaction of the hydrocarbon fuel with $O^{2-}$ from the electrolyte. Because electrons are produced in this reaction, the anode must be electrically conductive. Finally, the anode must have a coefficient of thermal expansion approximating that of the dense YSZ electrolyte to minimize cracking. The copper or copper-nickel anode provides the electrical conductivity or interconnection required of the anode. The copper acts also as an electronic or current collector for the electrons produced during the catalyst reaction of the fuel with $O^{2-}$.

A copper current collector and interconnect in a solid-oxide fuel cell anode would have a variety of forms including, but not limited to, meshes, gauzes, wires, plates (both flat and with ridges or protrusions), tubes, and other structured and pre-formed shapes.

In addition to using current collectors and interconnects that are pure Cu and copper-nickel alloys, other Cu-coated metals may be used. For example, stainless steel will have better mechanical properties than Cu at high temperatures. One method for taking advantage of the mechanical properties of stainless steel or other metals, while maintaining the inert chemical properties of Cu, is to plate Cu onto the structural metal. For these systems, the surface reactivity of the metal is passivated or eliminated via coating with the unreactive Cu. Cu coating allows for the use of a variety of metals in addition to Ni, including, without limitation, Fe, W and metal alloys, such as but not limited to ferritic steels (e.g., FeCrAl alloys), nickel alloys (e.g., Inconel 617) and Cr alloys (e.g., $Cr_5FeY_2O_3$) as current collectors and interconnects in SOFCs that run on dry hydrocarbons. In addition to the enhanced thermal stability of Cu-coated metals, the use of Cu-coated metals and alloys has the added advantage of decreased cost. Cu-coated metals and alloys that are used as current collectors and interconnects could have a wide variety of shapes such as those mentioned above for pure Cu.

The invention can be used in all SOFCs, for portable generators and for use, for example, in automobiles, ship propulsion and electric power generation.

The following EXAMPLES are provided merely to illustrate, not to limit the invention.

Example 1

A solid-oxide fuel cell having a porous ceramic-copper composite anode was prepared by the dual tape casting technique described hereinabove, which is set forth in additional detail in R. Gorte et al., Advanced Materials, 12:1465-69 (2000).

Example 2

A solid-oxide fuel cell was prepared according to the present invention, as follows. A tape of YSZ powders, polymer binder, and a carbon powder pore former was spread onto one surface of a YSZ tape without pore formers and calcined at 1,500° C. for two hours. The cathode was formed from a 50 wt. % physical mixture of Sr—LaMnO$_3$ and YSZ powder, pasted onto the opposite surface of the densified electrolyte in a glycerol slurry and then heated at 1,250° C. for two hours. Thereafter, the porous YSZ layer was impregnated with an aqueous solution of Cu(NO$_3$)$_2$ (Fisher Scientific) and Ce$_2$(NO$_3$)$_3$. After calcination at 950° C. for two hours, the copper salt was converted to the metallic form by heating to 800° C. in H$_2$.

Example 3

Comparative Test

Figure 5:
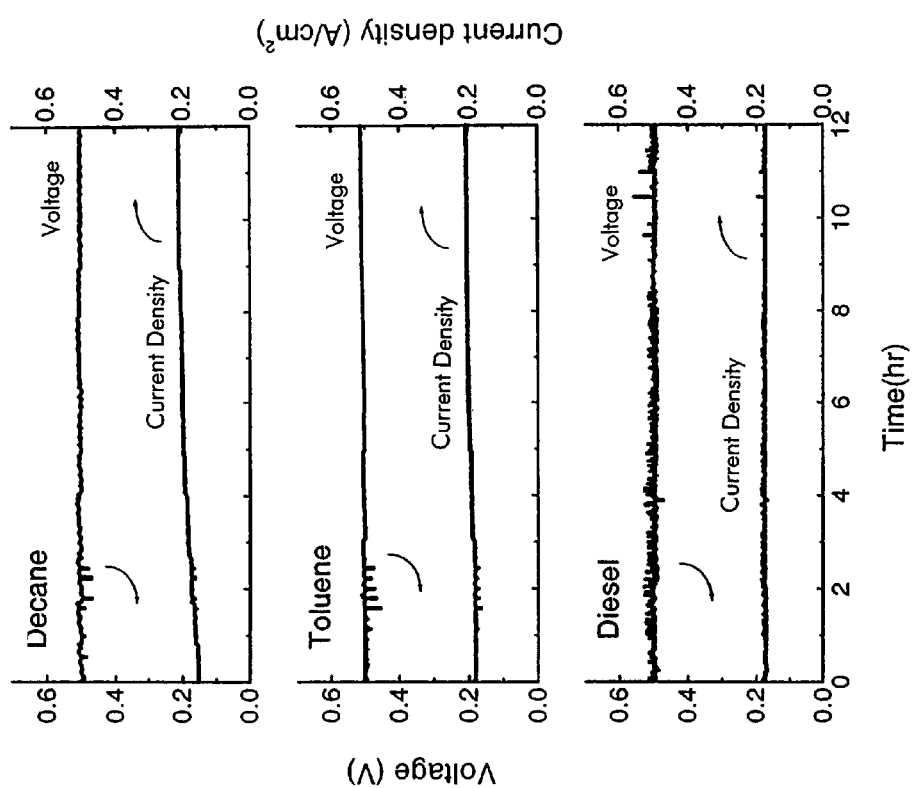
FIG. 5 depicts voltage and current density results obtained with the fuel cell of the invention using sulfur-free decane, toluene and diesel oil as fuel.

The solid oxide fuel cells of EXAMPLES 1 and 2 were tested to evaluate their performance using sulfur-free hydrocarbon as the fuel. The fuel cell of EXAMPLE 1 was operated with 40 wt % hydrocarbon in dry nitrogen at 700° C. and the electric values of voltage, current density and power density were measured as a function of time. The hydrocarbons employed were decane, toluene and diesel fuel. The results, as shown in FIG. 5, are typical results obtained for such tests.

Example 4

Figure 6:
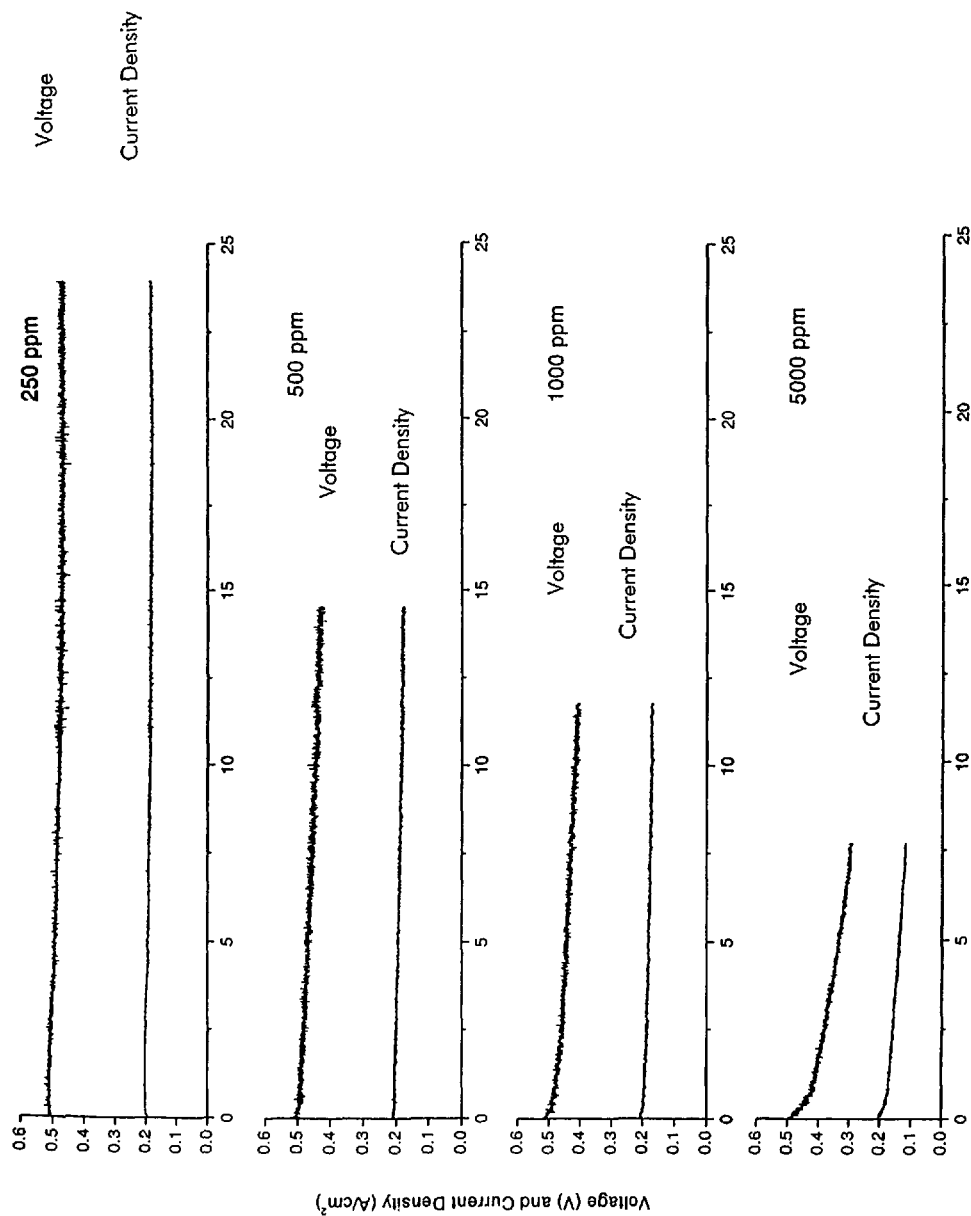
FIG. 6 depicts the voltage and current density produced from the cell of the type shown in FIG. 1B using n-decane containing different concentrations of sulfur.

In order to test the sensitivity of the anodes to sulfur, fuels containing various levels of sulfur were prepared by mixing thiophene with n-decane to achieve sulfur concentrations (wt % sulfur) in the n-decane of 250 ppm, 500 ppm, 1000 ppm and 5000 ppm. The n-decane/thiophene fuel mixture was used as fuel in a fuel cell under conditions set forth above in EXAMPLES 1 and 2. The concentration of the n-decane/thiophene fuel mixture was 40 wt % with dry nitrogen gas making up the rest of the fuel. The results for voltage and current density measured over time for the n-decane/thiophene fuel mixtures with these various concentrations of sulfur is shown in FIG. 6. These results indicate a very slight decline in performance for the n-decane/thiophene fuel with 250 ppm. FIG. 6 also indicates that the n-decane/thiophene fuel showed somewhat greater decrease in performance with increasing concentrations of sulfur. This result is consistent with FIG. 5, which indicates no change in performance over time with the use of n-decane that is sulfur-free. FIG. 6 demonstrates that the use of a hydrocarbon fuel comprising n-decane with a sulfur concentration of 250 ppm (prepared by adding thiophene) results in only very slight decreases in performance after twenty-four (24) FIG. 6 hours further demonstrates that the use of a hydrocarbon fuel with 1000 ppm sulfur produced a slightly higher rate of decrease in fuel cell performance, but that the fuel cell still operated close to its original capacity for over ten (10) hours. This result demonstrates that the fuel cell can be operated very effectively with hydrocarbons containing at least 1000 ppm sulfur and is operable even when the hydrocarbon fuel contains up to 5000 ppm sulfur.

Example 5

Figure 7:
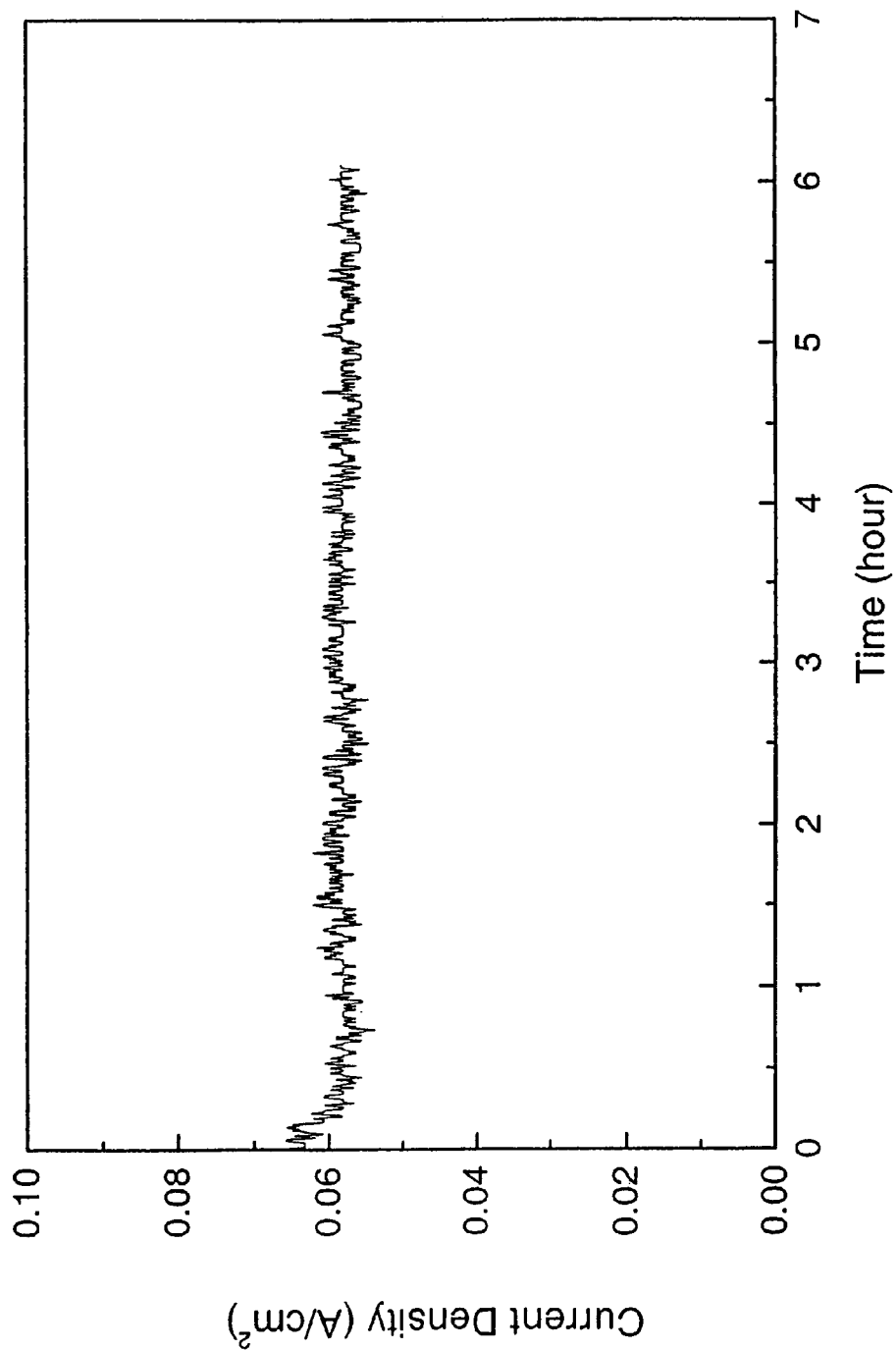
FIG. 7 depicts the maximum current density of a fuel cell operated with 40 wt % n-decane containing 5000 ppm sulfur in dry nitrogen in a fuel cell having a ceria-free copper-yttria stabilized zirconium anode.

The test procedures used in EXAMPLE 4 were repeated with the exception that the fuel cell comprised a ceria-free copper-yttria stabilized zirconia anode. The fuel employed was n-decane with 5000 ppm sulfur (prepared by the addition of thiophene). The fuel cell was operated with the cell shorted (i.e., at the maximum current). Cell current density was measured over time, and the results are shown in FIG. 7. FIG. 7 indicates that the current density was unaffected by the high sulfur levels, even after six (6) hours. The open circuit voltage (0.9 Volts) (not shown) was also unaffected. Visual inspection of the anode suggested that the sulfur had no effect on the copper. This inspection, combined with the data set forth in FIG. 7, further indicates that the use of hydrocarbon fuel containing very high levels (i.e., 5000 ppm) of sulfur has no effect on the Cu component or on the performance of a cell containing an anode in which copper is used for electrical conductivity. The overall performance of a fuel cell which contains Cu but not ceria, however, was not good, indicating that the inclusion of ceria in the anode enhances performance.

Example 6

Figure 8:
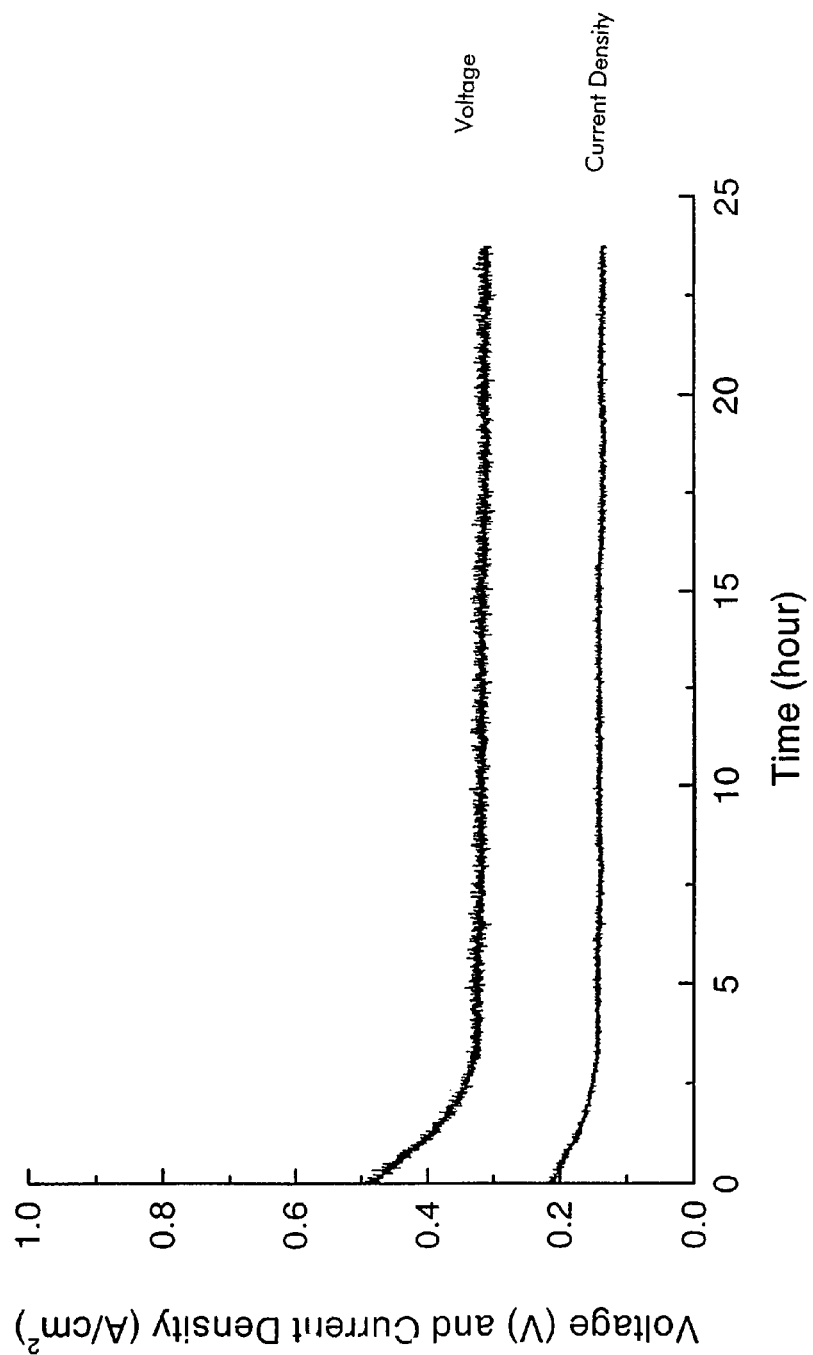
FIG. 8 depicts the voltage and current density of a fuel cell having an anode with a copper-ceria-yttria stabilized zirconia anode and operated with 40 wt % n-decane containing 5000 ppm sulfur in nitrogen gas.

The test conditions referenced in EXAMPLE 4 were repeated except that the fuel cell employed comprised a copper-yttria stabilized zirconia with ceria. The fuel used was again n-decane with the addition of thiophene to produce a sulfur concentration of 5000 ppm. The cell was operated for 24 hours. The results are shown in FIG. 8. FIG. 8 indicates that the performance data is similar to earlier results set forth in EXAMPLE 4. FIG. 6 indicates that fuel cell performance falls over the first five (5) hours but then reaches a steady state. This result is believed to be due to the formation after about five (5) hours of a Ce$_2$O$_2$S phase.

Without wishing to be bound by a particular scientific theory, the results set forth in EXAMPLES 5 and 6 are believed to have occurred for the following reasons. In order to understand the long-term effect of sulfur and whether the Cu-ceria anode will be stable in sulfur-containing environments, it is important to understand the mechanism for sulfur poisoning. At 700° C., the equilibrium constant for the reaction $2Cu+H_2S \rightleftharpoons H_2+Cu_2S$ is 1500. This implies that Cu will remain metallic in a mixture of H$_2$ and H$_2$S so long as the ratio of H$_2$:H$_2$S remains greater than 1500. While the equilibrium conditions for thiophene in hydrocarbons will be somewhat different from this, the equilibrium conditions suggest that Cu should be stable to sulfur poisoning until very high sulfur levels are produced. Equilibrium data for the reaction $2CeO_2+H_2S+H_2=Ce_2O_2S+2H_2O$, the reaction most likely to lead to poisoning of the CeO$_2$ catalyst, are given in D. Alan, R. Kay, W. G. Wilson and V. Jalan, *Journal of Alloys and Compounds*, 1993, 192, the entire disclosure of which is incorporated by reference herein. The stability of the Ce$_2$O$_2$S phase depends on both oxygen chemical potential as well as the sulfur chemical potential. For the typical conditions of fuel-cell anode, where the oxygen chemical potential is approximately $10^{-20}$ to $10^{-10}$ atmospheres, the equilibrium data suggests that the Ce$_2$O$_2$S phase will form if the chemical potential of H$_2$S is above $10^{-3}$ to $10^{-4}$ atm.

Example 7

Figure 9:
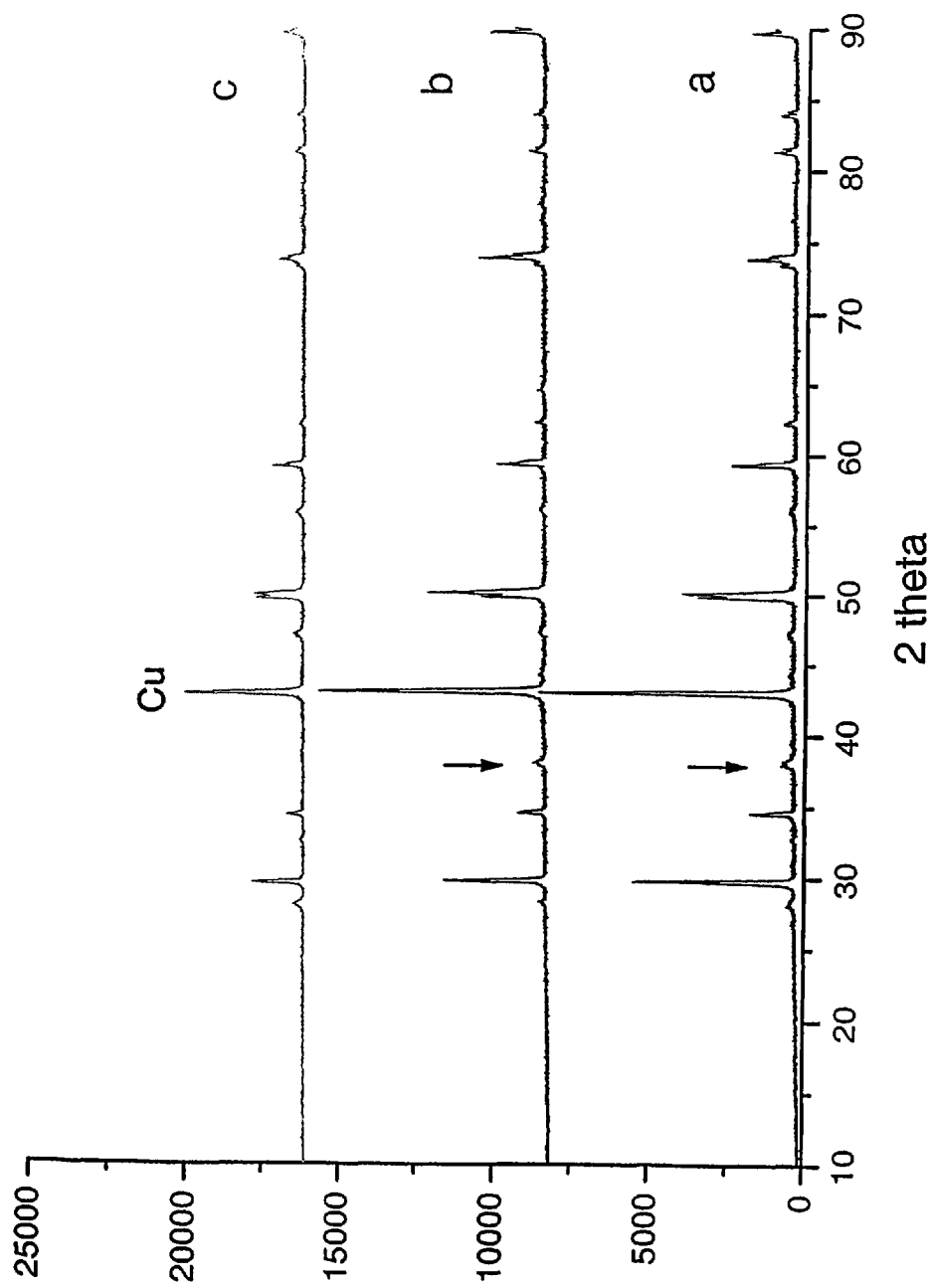
FIG. 9 depicts x-ray diffraction results for a copper-ceria-yttria stabilized zirconium anode after various treatment conditions.

The fuel cell with a copper-ceria-yttria stabilized zirconia was prepared and operated according to EXAMPLE 4 with the following additional test conditions. In a first test, the fuel cell was operated with a hydrocarbon fuel containing 250 ppm sulfur for twenty-four (24) hours, then operated with a hydrocarbon fuel containing 500 ppm sulfur for fourteen (14) hours, then operated with a hydrocarbon fuel containing 1000 ppm sulfur for twelve (12) hours and finally operated with a hydrocarbon fuel containing 5000 ppm sulfur for eight (8) hours. In the second test, the cell was operated with a hydrocarbon fuel containing 5000 ppm sulfur for seven (7) hours. In the third test, the fuel cell was operated with hydrocarbon fuel containing 500 ppm sulfur for twenty (20) hours. The copperceria-yttria stabilized zirconia anode of the cell was subjected to x-ray diffraction measurements after completion of each of these three tests, and the results are shown in FIG. 9 by lines under the letters "a-c." The diffraction data represented by "a" suggest that a new phase of ceria with a diffraction peak near 39° is formed at high levels of sulfur. The diffraction data from the third test (represented by "c") further indicate that moderate levels of sulfur do not lead to the formation of this new sulfided phase as a result of the presence of sulfur-containing species. In all three measurements, the peak at about 43° due to the metallic copper phase is clearly visible. This result is consistent with the results in EXAMPLE 6, which tend to show that the sulfur had no effect on the copper.

Example 8

Figure 10:
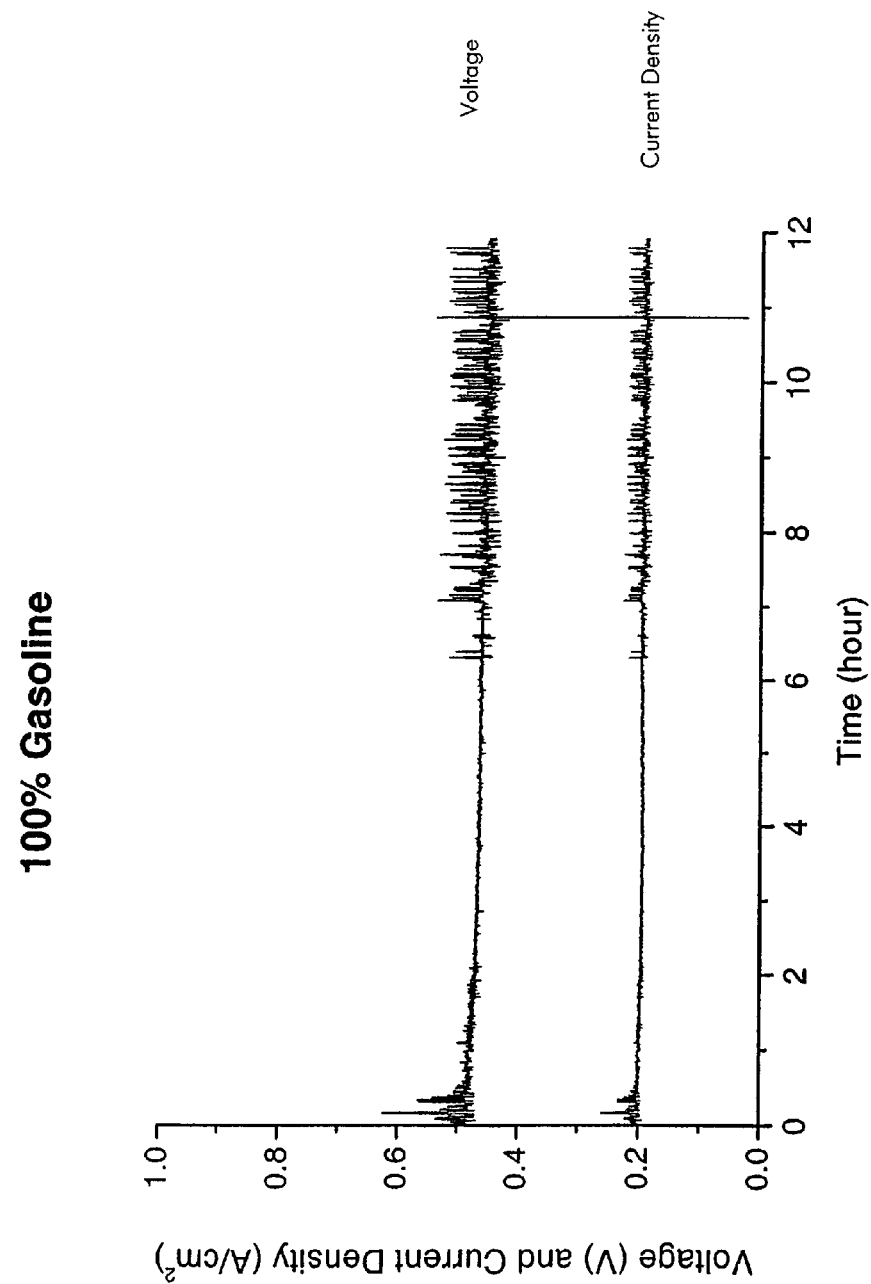
FIG. 10 depicts voltage and current density results for the fuel cell operated with 40% commercial gasoline in dry nitrogen gas.
Figure 11:
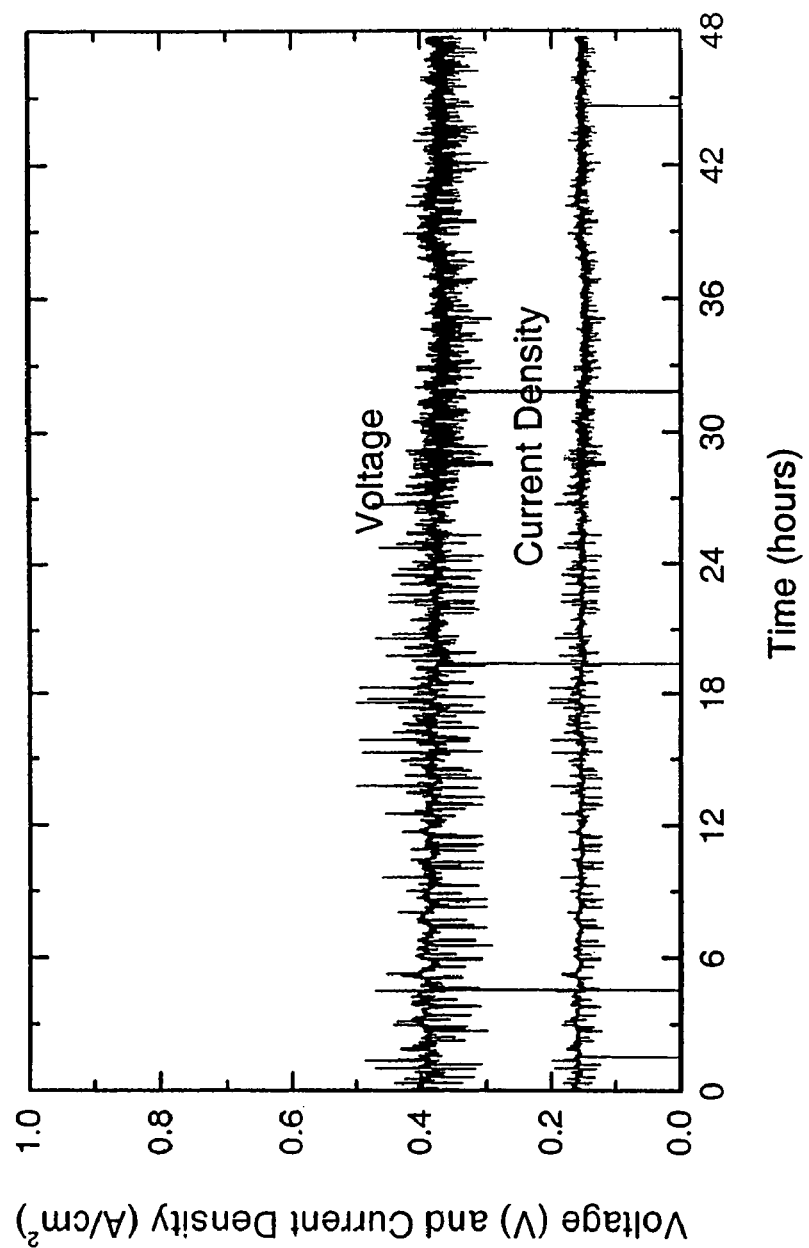
FIG. 11 depicts voltage and current density results for the fuel cell operated with 10% commercial gasoline in dry nitrogen.

The fuel cells of EXAMPLES 1 and 2 were tested under conditions set forth in EXAMPLE 4 with commercial gasoline used as the fuel. The fuel was 40 wt % gasoline in dry nitrogen gas. The results are shown in FIG. 10. FIG. 10 indicates that voltage and current density of the cell are stable over twelve (12) hours. This test was repeated with a 10 wt % gasoline in dry nitrogen for an additional forty-eight hours. The results of the repeated test, which are shown in FIG. 11, indicate that power generation by the cell remained stable over this additional period. These results demonstrate that the cell is capable of being operated over a considerable period of time with commercial gasoline.

After the completion of this testing, the anode of the fuel cell again underwent an x-ray diffraction measurement. The x-ray diffraction result showed lines characteristic of copper, ceria and yttria stabilized zirconia. No lines were observed which would be characteristic of sulfur-containing species. This x-ray diffraction data indicates that the sulfur present in a commercial grade of gasoline has no effect on the anode.

Example 9

Figure 12:
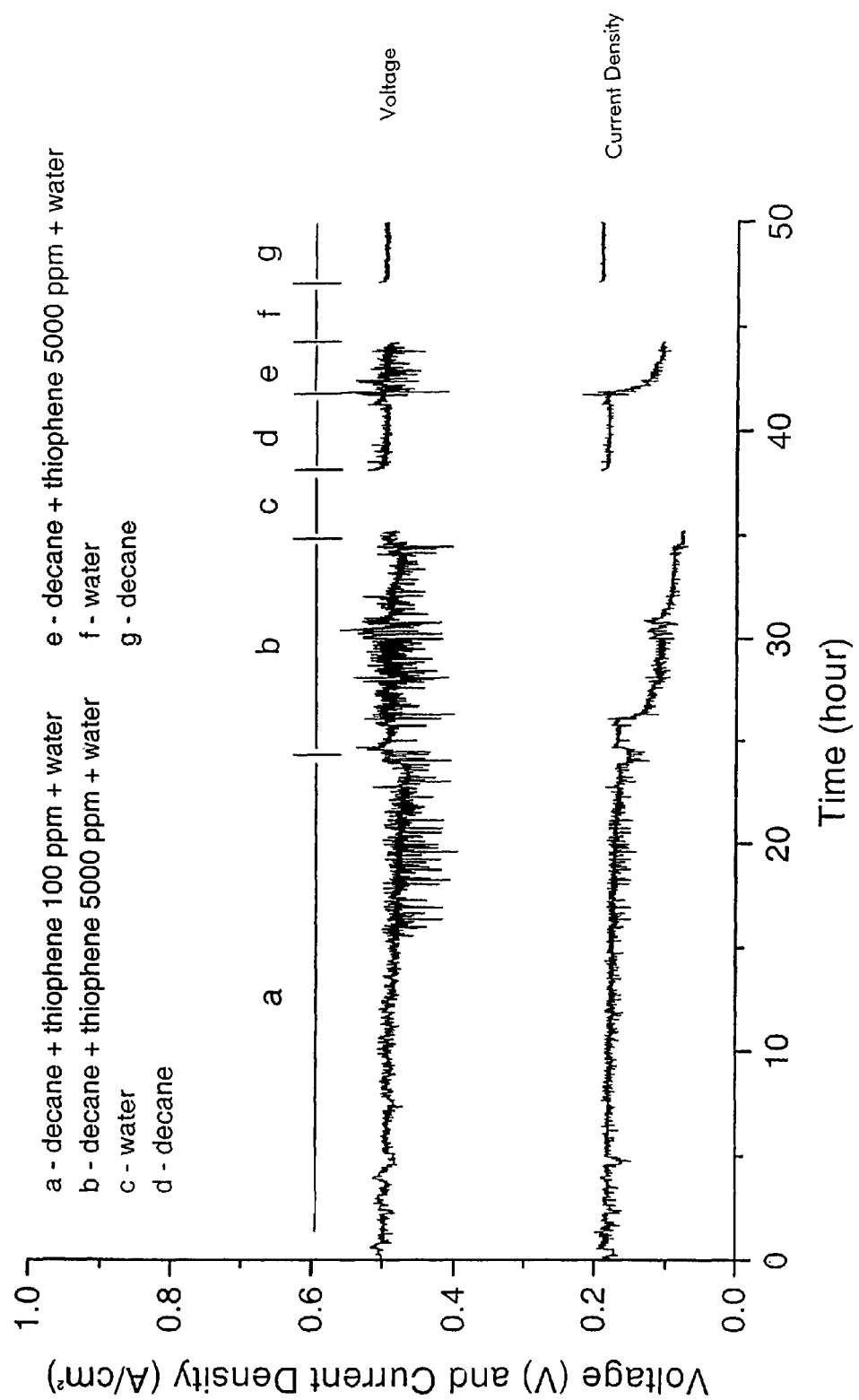
FIG. 12 depicts voltage and current density results for the fuel cell operated with decane containing different concentrations of sulfur.

The fuel cell with a copper-ceria-yttria stabilized zirconia was prepared and operated according to EXAMPLE 4 at 700° C. with different fuel mixtures. The initial mixture employed was (n-decane containing 100 ppm sulfur (presented as "thiophene")):steam:nitrogen gas in a ratio of 2:2:2. The next mixture employed was (n-decane containing 5000 ppm sulfur):steam:$N_2$ in a ratio of 2:2:2. After the mixture was replaced with steam, hydrocarbon mixtures of pure decane and decane containing 5000 ppm sulfur were used. The current density and voltage for the fuel cell for each of these mixtures are shown in FIG. 12. FIG. 12 indicates that the fuel cell continues to operate after the switch to n-decane containing 5000 ppm sulfur but that the current density decreases with time. FIG. 12 also indicates that fuel cell efficiency is restored after treatment with steam and during use of n-decane fuel.

Example 10

Figure 13:
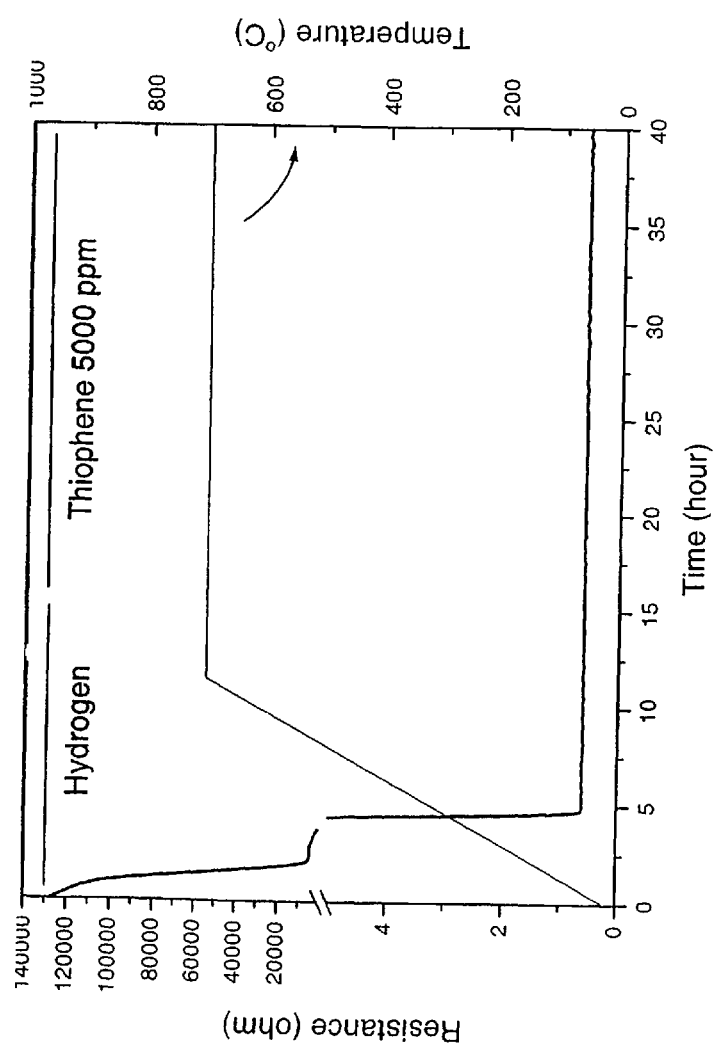
FIG. 13 depicts the change in resistance of the Cu-formed anode in a hydrocarbon fuel containing 5000 ppm sulfur as that conductor is heated to 700° C.

In this EXAMPLE using a freshly prepared cell, with an anode consisting of $Cu_2O$, $CeO_2$, and YSZ, the anode was treated by gradually heating to 700° C. in hydrogen gas. During this heating step, electrical resistance across the anode was measured in ohms over time and temperature. The results are shown in FIG. 13. FIG. 13 indicates that the resistance of the fuel cell conductor was lowered due to reduction of $Cu_2O$ to metallic Cu. The addition of a sulfur-containing fuel did not affect the resistivity of the Cu-containing anode, demonstrating the inertness of Cu to sulfur under these conditions.

Example 11

In this EXAMPLE, a Ni—YSZ cermet was formed by mixing 40% wt. NiO, 60% wt. YSZ, with graphite pore former, in a typical tape-casting slurry. A second layer with pure YSZ was cast over this, and the two layers were calcined at 1500° C. After heating the resulting ceramic wafer to 700° C. in $H_2$ to reduce the NiO to Ni, the wafer was boiled in $HNO_3$ to remove Ni. The weight change demonstrates that Ni was completely removed. Next, a 50% YSZ, 50% Sr-doped $LaMnO_3$ powder was applied to the dense side of the two-layer wafer to form a cathode. $Cu(NO_3)_2$ and $Ce(NO_3)_3$ were then impregnated into the porous side of the wafer, heated to decompose the nitrate, and reduced in $H_2$ at 700° C.

Example 12

Figure 14:
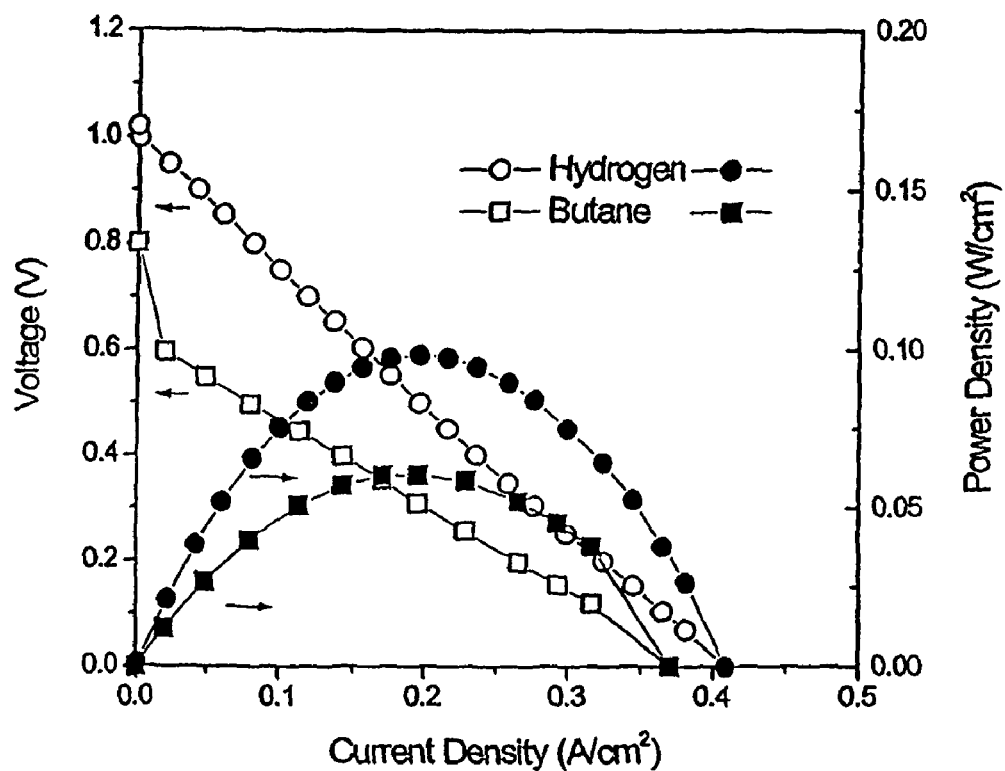
FIG. 14 is a graphical representation of fuel-cell performance as compared to current density curves for the operation of the solid-oxide fuel cell of the invention at 700° C. using hydrogen and butane as the fuels. Hydrogen is represented in the curves by a circle and butane by a square. The light circle and square denote results relating to cell voltage. The bold circle and square denote results relating to power density.

The cell potential as compared to current density curves for the fuel cell described in EXAMPLE 11 were measured at 700° C. in flowing $H_2$ and flowing butane, with the data shown in FIG. 14.

These results indicate that the performance of the cells with hydrogen and hydrocarbon fuels is comparable to cells prepared in other manners. Furthermore, the performance of the cell in dry butane was stable. Operation of a SOFC with a Ni-based anode is not possible due to rapid coke formation.

Example 13

Five nickel cermets were prepared by tape casting slurries of YSZ and NiO powders in ratios of YSZ to NiO of 70:30 (twice), 80:20, 90:10 and 60:40. All of the formulations also contained a graphite pore former.

The metal porosity and weight measurements were taken immediately after calcination of the green tapes in air at 1550° C. Subsequent measurements of porosity and weight were taken after heating the cermets in hydrogen gas (to reduce nickel oxide to nickel) and after leaching with boiling nitric acid. The results for porosity are given in TABLE 1A. The results for weight are given in TABLE 1B. The data demonstrate that essentially all of the Ni could be removed from the Ni cermet.

TABLE 1

A.

| YSZ/NiO mass ratio | Graphite Added (%) | Initial Porosity | After $H_2$ Porosity | After leaching Porosity |
|---|---|---|---|---|
| 70/30 | 22.2 | 0.362 | 0.431 | 0.455 |
| 80/20 | 32.9 | 0.414 | 0.474 | 0.460 |
| 90/10 | 32.9 | 0.405 | 0.432 | 0.430 |
| 70/30 | 15.2 | 0.425 | 0.472 | 0.564 |
| 60/40 | — | — | 0.384 | 0.419 |

B.

| YSZ/NiO mass ratio | Initial Weight (g) | After $H_2$ Weight (g) | After leaching Weight (g) | Estimated Weight (g) of (a) | Weight Change (%) |
|---|---|---|---|---|---|
| 70/30 | 0.74 | 0.70 | 0.55 | 0.52 | 21 |
| 80/20 | 0.55 | 0.52 | 0.40 | 0.44 | 23 |

TABLE 1-continued

| 90/10 | 0.81 | 0.79 | 0.74 | 0.73 | 6 |
| 70/30 | 0.86 | 0.80 | 0.62 | 0.60 | 22 |
| 60/40 | 1.13 | 1.06 | 0.78 | 0.68 | 26 |

(a) Estimated weight is based on the assumption that Ni can be leached completely.

While in the foregoing specification, this invention has been described and exemplified in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed:

1. A solid oxide fuel cell system capable of directly operating with a sulfur-containing hydrocarbon fuel that does not undergo prior treatment to remove organic sulfur compounds, comprising:
    (a) a solid electrolyte comprising an electronic insulator that allows transfer of anions;
    (b) an essentially nickel-free porous anode containing at least ceria deposited in the pores, the anode further comprising a ceramic, and at least a portion of the anode being bound to the electrolyte;
    (c) a cathode;
    (d) a fuel comprising a hydrocarbon having 2 or more carbons, and the fuel being characterized as having a sulfur content of from about 1 ppm to about 5000 ppm; and
    (e) an oxygen source;
        wherein the solid electrolyte and the porous anode overlap one another so as to define a region of physical contact between one another, the region of physical contact being characterized as an essentially uninterrupted interface.

2. The fuel cell according to claim 1, wherein the hydrocarbon is a petroleum distillate.

3. The fuel cell according to claim 2, wherein the petroleum distillate is selected from the group consisting of gasoline, diesel oil, naphtha, JP-4, JP-5, JP-8, kerosene, motor oil, natural gas, fuel oil, and mixtures thereof.

4. The fuel cell according to claim 3, wherein the petroleum distillate is selected from the group consisting of JP-4, JP-5, JP-8, and mixtures thereof.

5. The fuel cell according to claim 3, wherein the petroleum distillate is selected from the group consisting of naptha, kerosene, fuel oil, and mixtures thereof.

6. The fuel cell according to claim 3, wherein the petroleum distillate is selected from the group consisting of gasoline, diesel oil, natural gas, and mixtures thereof.

7. The fuel cell according to claim 2, wherein the hydrocarbon comprises an alcohol.

8. The fuel cell according to claim 7, wherein the alcohol comprises ethanol.

9. The fuel cell according to claim 2, wherein the hydrocarbon is selected from the group consisting of butane, toluene, decane, and mixtures thereof.

10. The fuel cell according to claim 1, wherein the sulfur containing hydrocarbon fuel has a sulfur content of from about 1 ppm to about 1000 ppm.

11. The fuel cell according to claim 10, wherein the sulfur-containing hydrocarbon fuel has a sulfur content of from about 10 ppm to about 1000 ppm.

12. The fuel cell according to claim 11, wherein the sulfur-containing hydrocarbon fuel has a sulfur content of from about 20 ppm to about 1000 ppm.

13. The fuel cell according to claim 12, wherein the sulfur-containing hydrocarbon fuel has a sulfur content of from about 100 ppm to about 1000 ppm.

14. The fuel cell according to claim 13, wherein the sulfur-containing hydrocarbon fuel has a sulfur content of from about 250 ppm to about 1000 ppm.

15. The fuel cell system according to claim 1 wherein the solid electrolyte is an oxide ion conducting material.

16. The fuel cell according to claim 15, wherein the oxide ion conducting material is selected from the group consisting of doped ceria, doped zirconia, and doped lanthanum gallate.

17. The fuel cell according to claim 16, wherein the doped ceria is selected from the group consisting of gadolinium doped ceria, samarium-doped ceria, yttria-doped ceria, and mixtures thereof.

18. The fuel cell according to claim 16, wherein the doped zirconia is scandium-doped zirconia.

19. The fuel cell according to claim 15, wherein the oxide ion conducting material is yttria-doped zirconia.

20. The fuel cell system of claim 1, wherein the anode further comprises copper deposited in the pores.

21. A process of producing electrical energy, comprising:
    (a) providing a solid oxide fuel cell system capable of directly operating with a sulfur-containing hydrocarbon fuel that does not undergo prior treatment to remove organic sulfur compounds, the solid oxide fuel cell system comprising:
        a solid oxide electrolyte comprising an electronic insulator that allows transfer of anions;
        an essentially nickel-free porous anode containing at least ceria deposited in the pores, the anode further comprising a ceramic, and at least a portion of the anode being bound to the electrolyte; and
        a cathode, and
        a fuel comprising a hydrocarbon having two or more carbons, and the fuel being characterized as having a sulfur content of from about 1 ppm to about 5000 ppm,
        wherein the solid electrolyte and the anode overlap one another so as to define a region of physical contact between one another, the region of physical contact being characterized as an essentially uninterrupted interface,
    (b) contacting the cathode with an oxygen source; and
    (c) contacting the porous anode with the fuel.

22. The process according to claim 21, wherein the hydrocarbon is a petroleum distillate.

23. The process according to claim 22, wherein the petroleum distillate is selected from the group consisting of gasoline, diesel oil, naphtha, JP-4, JP-5, JP-8, kerosene, motor oil, natural gas, fuel oil, and mixtures thereof.

24. The process according to claim 23, wherein the petroleum distillate is selected from the group consisting of JP-4, JP-5, JP-8, and mixtures thereof.

25. The process according to claim 23, wherein the petroleum distillate is selected from the group consisting of naphtha, kerosene, fuel oil, and mixtures thereof.

26. The process according to claim 23, wherein the petroleum distillate comprises gasoline.

27. The process according to claim 23, wherein the petroleum distillate comprises diesel oil.

28. The process according to claim 21, wherein the hydrocarbon is selected from the group consisting of alcohols, butane, toluene, decane, and mixtures thereof.

29. The process according to claim 28, wherein the hydrocarbon comprises an alcohol.

30. The process according to claim 29, wherein the alcohol comprises ethanol.

31. The process according to claim 21, wherein the sulfur containing hydrocarbon has a sulfur content of from about 10 ppm to about 1000 ppm.

32. The process of claim 21, wherein the anode further comprises copper deposited in the pores.

33. A solid oxide fuel cell system capable of directly operating with a sulfur-containing hydrocarbon fuel that does not undergo prior treatment to remove organic sulfur compounds, comprising:
(a) a solid electrolyte comprising an electronic insulator that allows transfer of anions;
(b) an essentially nickel-free porous anode containing at least copper deposited in the pores, the anode further comprising a ceramic, and at least a portion of the anode being bound to the electrolyte;
(c) a cathode;
(d) a fuel comprising a hydrocarbon having 2 or more carbons, and the fuel being characterized as having a sulfur content of from about 1 ppm to about 5000 ppm; and
(e) an oxygen source;
wherein the solid electrolyte and the porous anode overlap one another so as to define a region of physical contact between one another, the region of physical contact being characterized as an essentially uninterrupted interface.

* * * * *